United States Patent [19]
Asahina et al.

[11] Patent Number: 5,190,826
[45] Date of Patent: Mar. 2, 1993

[54] INTERLAYERS FOR USE IN SOUND-INSULATING LAMINATED GLASSES

[75] Inventors: Kenichi Asahina, Shiga; Naoki Ueda, Osaka; Hirofumi Omura, Shiga, all of Japan

[73] Assignee: Sekisui Chemical Co., Ltd., Osaka, Japan

[21] Appl. No.: 699,073

[22] Filed: May 13, 1991

[30] Foreign Application Priority Data

May 14, 1990 [JP] Japan .................... 2-123600
Dec. 27, 1990 [JP] Japan .................... 2-408395

[51] Int. Cl.$^5$ ............................................. B32B 17/10
[52] U.S. Cl. ................................ 428/437; 181/176; 181/294; 252/62; 428/515; 428/524; 428/525; 525/155; 525/328.7; 525/328.8
[58] Field of Search ............... 428/437, 210, 515, 524, 428/525; 525/61, 79, 155, 328.7, 328.8; 252/62; 181/176, 294

[56] References Cited

U.S. PATENT DOCUMENTS

| | | | |
|---|---|---|---|
| 2,232,806 | 2/1941 | Ryan et al. | 428/437 |
| 2,234,829 | 3/1941 | Neher et al. | 428/437 |
| 3,783,084 | 7/1971 | Quenett | 428/437 |
| 4,107,366 | 8/1978 | Rieser et al. | 428/437 |

Primary Examiner—Paul J. Thibodeau
Assistant Examiner—Hoa T. Le
Attorney, Agent, or Firm—Armstrong, Westerman, Hattori, McLeland & Naughton

[57] ABSTRACT

An interlayer for use in sound-insulating laminated glasses which is in the form of a laminated film of two kinds of resin films (A) and (B), each comprising a polyvinyl acetal acetalized with an aldehyde having 6 to 10 carbon atoms for the film (A) or with an aldehyde having 1 to 4 carbon atoms for the film (B), or is in the form of a resin film (C) comprising a mixture of the two kinds of polyvinyl acetal resins. The interlayer mitigates the coincidence effect to prevent the reduction of TL value without impairing the basic characteristics required of laminated glasses thereby permitting the interlayer to exhibit outstanding sound-insulating properties over a wide temperature range for a prolonged period of time.

13 Claims, 1 Drawing Sheet

INTERLAYERS FOR USE IN SOUND-INSULATING LAMINATED GLASSES

FIELD OF THE INVENTION

The present invention relates to interlayers for use in preparing laminated glasses which exhibit outstanding sound-insulating properties over a wide temperature range for a prolonged period of time.

DESCRIPTION OF THE PRIOR ART

Generally, laminated glasses comprising a pair of glass plates and a resin film sandwiched therebetween produce no splinters flying off when broken, ensure high safety and are therefore widely used, for example, as windshields or window glass for motor vehicles and like traffic vehicles, window glass for buildings, etc.

Among interlayers for use in such laminated glasses, resin films of polyvinyl butyral plasticized with a plasticizer have good adhesion to glass, high tensile strength and high transparency, and laminated glasses fabricated with use of the resin film are especially suited as window glass for vehicles.

On the other hand, it is desired that the window glass for buildings be less susceptible to the scattering of fragments when broken and also outstanding in sound-insulating properties.

Sound-insulating properties are generally expressed in terms of transmission losses at varying frequencies. According to JIS A4708, a definite transmission loss value is prescribed for each particular sound insulation rating over the frequency range of at least 500 Hz as indicated in a solid line in FIG. 1. Incidentally, glass plates exhibit greatly impaired sound-insulating properties due to a coincidence effect over a frequency range of around 2000 Hz as represented by a broken line in FIG. 1. (The furrow of the broken line in FIG. 1 corresponds to the impaired sound-insulating properties lower than the specified level and resulting from the coincidence effect.) The term the "coincidence effect" refers to such a phenomenon that when a sound wave is incident on the glass plate, a transverse wave is propagated on the glass surface to undergo resonance with the incident sound owing to the rigidity and inertia of the glass plate, which consequently permits the transmission of the sound therethrough.

Conventional laminated glasses, although excellent in safety by not permitting scattering of broken fragments, also invariably exhibit impaired sound-insulating properties due to the coincidence effect in the frequency range of around 2000 Hz and therefore still remain to be improved in this respect.

To give improved sound-insulating properties to laminated glasses, it is required to mitigate the coincidence effect stated above and to prevent the decrease in the minimum value of transmission losses due to the coincidence effect. (The minimum value of transmission losses will hereinafter be referred to as a "TL value," see FIG. 1.)

To prevent the decrease of the TL value, various proposals have heretofore been made, such as an increase of the mass of laminated glasses and division of glass areas into smaller subareas. Nevertheless, none of these proposals has achieved a satisfactory result and are economically unjustifiable.

Recently, more improved sound-insulating properties have been required of laminated glasses. For example, those for building windows need to exhibit excellent sounnd-insulating properties at all times without being influenced by variations in the atmospheric temperature through the seasons.

The prior art has provided, for example, the following interlayers adapted to give improved sound-insulating properties to laminated glasses.

Examined Japanese Patent Publication SHO 46-5830 discloses an interlayer which is made of a resin, such as polyvinyl butyral, having approximately three times the fluidity of usual interlayers.

Unexamined Japanese Patent Publication SHO 62-37148 discloses an interlayer in the form of a laminate comprising at least two kinds of viscoelastic materials which are different in acoustic resistance, such as a laminate film comprising a polymethyl methacrylate film and a vinyl chloride-ethylene-glycidyl methacrylate copolymer film.

Unexamined Japanese Patent Publication SHO 60-27630 proposes an interlayer of polyvinyl chloride resin having a plasticizer incorporated therein for affording improved initial sound-insulating properties.

Unexamined Japanese Patent Publication SHO 62-278148 proposes an interlayer of low self-adhesion for use in glass laminates which comprises a plasticizer and a polyacetal resin prepared by acetalizing polyvinyl alcohol with an aldehyde having 6 to 10 carbon atoms.

Unexamined Japanese Patent Publication HEI 2-229742 discloses an interlayer in the form of a laminate film which comprises a high polymer film up to 15° C. in glass transition temperature, such as a vinyl chloride-ethylene-glycidyl methacrylate copolymer film, and a plasticized polyvinyl acetal film.

Among these prior-art interlayers for sound-insulating laminated glasses, the interlayer of Publication SHO 46-5830 has the serious problem that the laminated glass incorporating this layer is low in the absolute value of sound-insulating properties.

The interlayer of Publication SHO 62-37148 has the drawback that the laminated glass prepared is not satisfactory in initial sound-insulating properties and exhibits impaired long-term durability. The drawback is attributable to the fact that the interface between the component resins permits migration of some subtances through diffusion, failing to effectively serve as a constrained layer.

The interlayer of Publication SHO 60-27630 exhibits somewhat improved sound-insulating properties, whereas migration of the plasticizer present further proceeds similarly, consequently achieving no improvement in long-term durability.

The interlayers of Publication SHO 62-278148 and Publication HEI 2-229742 still remain to be improved in giving sound-insulating properties to laminated glasses.

Thus, the interlayers of the prior art described fail to provide laminated glasses which exhibit excellent sound-insulating properties especially over a wide temperature range for a long period of time.

In view of the foregoing problems, the main object of the present invention is to provide an interlayer for use in sound-insulating laminated glasses which is adapted to retain a high TL value by mitigating the coincidence effect and to exhibit excellent sound-insulating properties over a wide temperature range with good stability for a prolonged period of time, and which nevertheless possesses the basic characteristics required of the laminated glass, such as transparency, weather resistance, impact energy absorbing properties and adhesion to glass.

SUMMARY OF THE INVENTION

With attention directed to the fact that resin films comprising polyvinyl acetal and a plasticizer and heretofore in use as interlayers for laminated glasses have characteristics, such as transparency, weather resistance, impact energy absorbing properties and adhesion to glass, in good balance, we have conducted intensive research on improvements in interlayers of the above composition to give improved sound-insulating properties without impairing the satisfactory characteristics. Consequently, we have found that when two kinds of specific polyvinyl acetal resins are used in combination for preparing interlayers, the coincidence effect can be mitigated to result in a higher TL value and to prevent diminution of the sound-insulating properties due to this effect, permitting the interlayer to exhibit outstanding sound-insulating properties over a wide temperature range for a prolonged period of time. Thus, the present invention has been accomplished.

An interlayer of the present invention for use in laminated glasses is a laminated film which comprises at least one resin film (A) and at least one resin film (B), the resin film (A) comprising a resin (a) and a plasticizer, the resin film (B) comprising a resin (b) and a plasticizer, the resin (a) being a polyvinyl acetal prepared by acetalizing a polyvinyl alcohol with an aldehyde having 6 to 10 carbon atoms, the resin (b) being a polyvinyl acetal prepared by acetalizing a polyvinyl alcohol with an aldehyde having 1 to 4 carbon atoms (hereinafter referred to as the "laminate type").

The invention provides another interlayer having sound-insulating properties which is a resin film (C) comprising a mixture of two kinds of resins (a) and (b), and a plasticizer, the resin (a) being a polyvinyl acetal prepared by acetalizing a polyvinyl alcohol with an aldehyde having 6 to 10 carbon atoms, the resin (b) being a polyvinyl acetal prepared by acetalizing a polyvinyl alcohol with an aldehyde having 1 to 4 carbon atoms (hereinafter referred to as the "resin mixture type").

DESCRIPTION OF THE PREFERRED EMBODIMENTS

Figure 1:
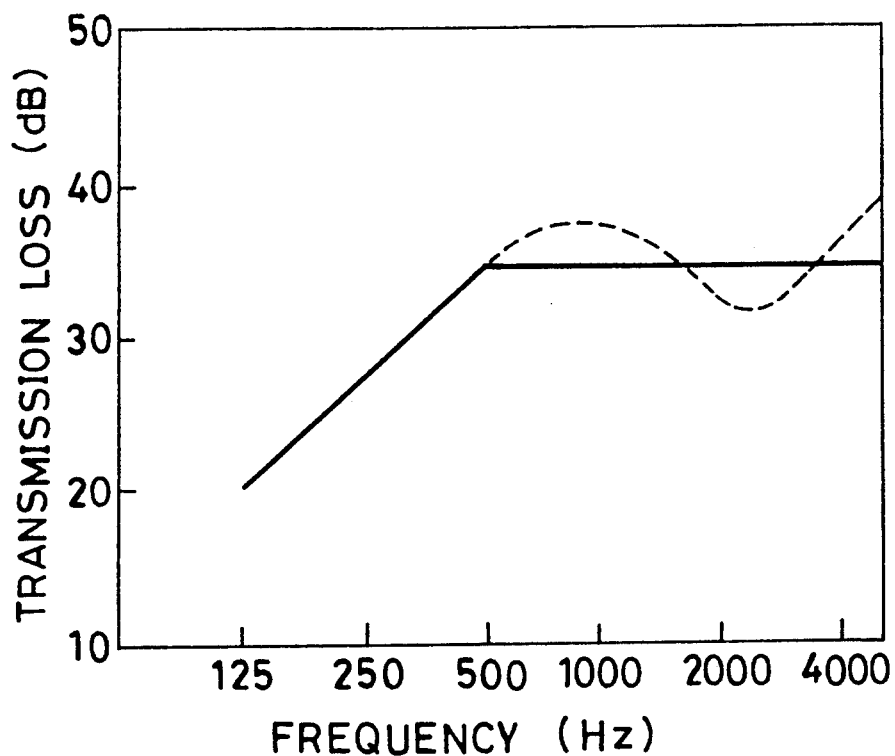
FIG. 1 is a graph showing the sound-insulating characteristics of laminated glass in terms of transmission loss relative to the frequency.

Especially preferable as an interlayer of the laminate type having the structure stated above is one wherein the laminated film comprises a resin film (A) and resin films (B) formed on the respective opposite sides thereof, the resin (a) is a polyvinyl acetal obtained by acetalizing a polyvinyl alcohol with an aldehyde having 6 to 8 carbon atoms, and the resin (b) is a polyvinyl acetal obtained by acetalizing a polyvinyl alcohol with butyraldehyde.

Especially preferred as an interlayer of the resin mixture type stated above is one wherein the resin (a) is a polyvinyl acetal obtained by acetalizing a polyvinyl alcohol with an aldehyde having 6 to 8 carbon atoms, and the resin (b) is a polyvinyl acetal obtained by acetalizing a polyvinyl alcohol with butyraldehyde. The ratio of the resin (a) to the resin (b) to be mixed therewith is in the range of 45:55 to 80:20 by weight.

Preferred polyvinyl alcohols are those having an average polymerization degree of 1000 to 3000 because if the degree is less than 1000, the laminated glass obtained is low in penetration resistance and further because if the degree is over 3000, excessive strength will result, rendering the laminated glass obtained usually unusable as safety glass. The polyvinyl alcohol to be used is preferably at least 95 mole % in saponification degree to give the film satisfactory transparency and heat resistance.

Examples of aldehydes having 6 to 10 carbon atoms and useful for preparing the resin (a) are aliphatic, aromatic or alicyclic aldehydes such as n-hexylaldehyde, 2-ethylbutyraldehyde, n-heptylaldehyde, n-octylaldehyde, n-nonylaldehyde, n-decylaldehyde, benzaldehyde and cinnamaldehyde. These aldehydes are used singly, or at least two of them are used in combination. Use of aldehydes having more than 10 carbon atoms is undesirable since the polyvinyl acetal then obtained is low in rigidity and exhibits impaired sound-insulating properties.

On the other hand, examples of aldehydes having 1 to 4 carbon atoms and useful for preparing the resin (b) are formaldehyde, acetaldehyde, propionaldehyde, n-butyraldehyde, isobutyraldehyde and the like, which are used singly, or at least two of these aldehydes are used in combination.

Polyvinyl acetals are prepared, for example, by dissolving a polyvinyl alcohol in hot water to obtain an aqueous solution, adding the desired aldehyde and catalyst to the solution as maintained at a required temperature to cause an acetalization reaction to proceed, and thereafter maintaining the reaction mixture at an elevated reaction temperature to complete the reaction, followed by neutralization, washing with water and drying to obtain the product in the form of a resin powder. The polyvinyl acetal to be obtained is preferably at least 50 mole % in acetalization degree. If less than 50 mole % in this degree, the acetal is low in compatibility with plasticizers, presenting difficulty in using the plasticizer in an amount required for ensuring penetration resistance.

The plasticizer to be admixed with the resin is a monobasic acid ester, polybasic acid ester or like organic plasticizer, or an organic phosphate or organic phosphite plasticizer.

Examples of preferred monobasic acid esters are glycol esters prepared by the reaction of triethylene glycol with butyric acid, isobutyric acid, caproic acid, 2-ethylbutyric acid, heptanoic acid, n-octylic acid, 2-ethylhexylic acid, pelargonic acid (n-nonylic acid), decylic acid or like organic acid. Also useful are esters of tetraethylene glycol or tripropylene glycol with such organic acids.

Examples of preferred polybasic acid esters are those prepared from adipic acid, sebacic acid, azelaic acid or like organic acid and a straight-chain or branched-chain alcohol having 4 to 8 carbon atoms.

Examples of preferred phosphate or phosphite plasticizers are tributoxyethyl phosphate, isodecylphenyl phosphate, triisopropyl phosphite and the like.

More preferred examples include monobasic acid esters such as triethylene glycol di-2-ethylbutyrate, triethylene glycol di-2-ethylhexoate, triethylene glycol dicaproate and triethylene glycol di-n-octoate, and dibasic acid esters such as dibutyl sebacate, dioctyl azelate and dibutylcarbitol adipate.

The plasticizer is used preferably in an amount of 20 to 60 parts by weight per 100 parts by weight of the polyvinyl acetal. If the plasticizer content is less than 20 parts by weight, the laminated glass obtained is lower in penetration resistance, whereas if the content is in excess of 60 parts by weight, the plasticizer will bleed out to impair the transparency of the laminated glass or the adhesion of the resin film to glass plates. More preferably, the plasticizer content is in the range of 30 to 55 parts by weight per 100 parts by weight of the polyvinyl acetal.

Additives which are usually used for adjusting the adhesion of resin films to glass plates, and stabilizers, antioxidants, ultraviolet absorbers, etc. for preventing the deterioration of polyvinyl acetals can be used suitably as required when the polyvinyl acetal and the plasticizer are mixed together or in the process for preparing the polyvinyl acetal.

Examples of useful additives are metal salts of carboxylic acids including potassium, sodium or like alkali metal salts of octylic acid, hexylic acid, butyric acid, acetic acid, formic acid and the like, calcium, magnesium or like alkaline earth metal salts of these acids, and zinc and cobalt salts of such acids. Examples of useful stabilizers are surfactants such as sodium laurylsulfate and alkylbenzenesulfonic acids. Examples of useful antioxidants are tert-butyl-hydroxytoluene (BHT), "IRGANOX 1010," product of Ciba-Geigy, etc. Examples of useful ultraviolet absorbers are those of benzotriazol type, hindered amine type, etc. Examples of suitable benzotriazole absorbers are "TINUVIN P," "TINUVIN 320," "TINUVIN 326" and "TINUVIN 328," products of Ciba-Geigy, etc. Examples of preferred hindered amine absorbers include "LA-57," product of Adeka Argus Chemical Corporation.

The interlayers of the laminate type are laminates each comprising at least one resin film (A) prepared from the resin (a) as plasticized with a plasticizer, and at least one resin film (B) prepared from the resin (b) similarly as plasticized with a plasticizer. These laminates have, for example, the following structures.

(1) Two-layer laminate structure of resin film (A)/resin film (B).
(2) Three-layer laminate structures such as resin film (A)/resin film (B)/resin film (A), and resin film (B)/resin film (A)/resin film (B).
(3) Multilayer laminate structures having at least four layers, such as resin film (A)/resin film (B)/resin film (A)/resin film (B).

The multilayer laminate structures comprising at least three layers may have a multilayer structure wherein resin layers of the same kind are laminated, such as resin film (A)/resin film (B)/resin film (B).

Since the sound-insulating properties of laminated glasses of the present invention are due to the reflection of sound at and absorption of sound by the interface between the component resin films, the interlayer exhibits more excellent sound-insulating properties when comprising an increased number of resin films. Further since the sound-insulating properties are attributable to the laminated film of resin layer (A) and resin layer (B) which serves as a constrained laminated layer acting to absorb sound energy, the laminate structures given above are not limitative but various other laminate structures are also included in the embodiments of the invention. For example, a resin film (A') and a resin film (A") may be prepared as resin films (A) from polyvinyl acetals obtained by the use of two different kinds of aldehydes having 6 to 10 carbon atoms for acetalization to provide structures comprising these two kinds of resin films, and resin films (B) in combination (e.g., the five-layer laminate of resin film (A')/resin film (B)/resin film (A")/resin film (B)/resin film (A')).

To assure sound-insulating properties over a wide temperature range, the component resin films of the laminated film must usually be at least 1 $\mu$m, and are preferably at least 5 $\mu$m to be useful, in thickness.

The thickness of the interlayers of either the laminate type or the resin mixture type is the same as that of usual interlayers for laminated glasses and is preferably in the range of 0.2 to 1.6 mm. This thickness, if larger, results in more excellent sound-insulating properties, but when consideration is given also to the strength to assure the laminated glass of impact resistance and penetration resistance, the thickness in the above range is desirable for use. More preferably, the thickness of the interlayer is in the range of 0.3 to 1.2 mm.

The resin film can be formed, for example, by dissolving the desired polyvinyl acetal, as plasticized with a plasticizer, in a solvent, preparing a coating from the solution using a suitable coater, and thereafter drying the coating. Alternatively, the film can be formed, for example, by extrusion or calendering.

Laminated glasses can be prepared by sandwiching the interlayer between glass plates by methods generally used for fabricating laminated glasses. For example, the laminated glass is produced by preparing a laminated film by suitably superposing resin film(s) (A) and resin film(s) (B) for the laminate type or preparing a resin film (C) for the resin mixture type, sandwiching the laminated film or the resin film (C) between two glass plates, removing air from the resulting unbonded assembly, and hot-pressing the assembly. Also suitable to use for the laminate type are a method wherein a composition in the form of a solution and comprising a resin (a) and a plasticizer is applied to a resin film (B) or to a glass plate, and drying the resulting coating, and a method wherein a laminated film is prepared from resin film(s) (A) and resin film(s) (B) by multilayer extrusion and is thereafter sandwiched between and adhered to two glass plates. Such a coating method can be used also for the resin mixture type.

The sound-insulating interlayer of the present invention may be laminated to a rigid material, such as metal or inorganic material, other than glass, or to polycarbonate plates or like transparent resin plates, i.e., to organic glass plates.

The laminated glass in the form of a sandwich and thus prepared can be made into a multilayer laminated glass by laminating a special glass plate to at least one surface of the sandwich with or without an interlayer, having sound-insulating properties or other function, interposed therebetween. When required, the multilayer laminated glass can be made to have an increased number of component layers by laminating another special glass plate to at least one surface of the laminate with or without an interlayer, having sound-insulating properties or other function, interposed therebetween. Suitable interlayers having other function are those having heat resistance or flame retardancy or imparting impact resistance or penetration resistance. Examples of special glass plates are polycarbonate plates and like organic glass plates, and inorganic glass plates having special properties such as heat ray reflectivity and fire resistance.

Examples of such multilayer laminated glasses have the following structures.

Glass plate/sound-insulating interlayer/glass plate/- flame-retardant interlayer/glass plate.

Glass plate/sound-insulating interlayer/glass plate/- fire-resistant inorganic glass plate/polycarbonate plate.

EMBODIMENTS

Given below are examples of the invention and comparative examples for comparison therewith, along with the sound-insulating properties of the laminated glasses obtained.

EXAMPLE 1 i) Preparation of Resin (a)

To 2900 g of pure water was added 193 g of polyvinyl alcohol having a polymerization degree of 1700 and a saponfication degree of 98.9 mole %, and the mixture was heated to prepare a solution. A 201 g quantity of 35% hydrochloric acid and 192 g of n-octylaldehyde were then added to the solution as adjusted to a temperature of 28° C. The temperature of the solution was then lowered to 2° C. and maintained at this level to cause a polyvinyl acetal to separate out. The reaction mixture was thereafter maintained at 30° C. for 5 hours to complete the reaction, followed by neutralization, washing with water and drying to give polyvinyl octyl acetal in the form of white resin particles (acetalization degree: 64.6 mole %).

ii) Preparation of Resin Film (A)

A 50 g quantity of the polyvinyl octyl acetal was collected, to which 20 g of triethylene glycol di-2-ethylbutyrate was added as a plasticizer. The mixture was thoroughly kneaded with a mixing roll mill, and a predetermined amount of the kneaded mixture was held in a press at 150° C. for 30 minutes to obtain a resin film (A) having a thickness of 0.20 mm.

iii) Preparation of Resin (b)

To 2900 g of pure water was added 190 g of polyvinyl alcohol having a polymerization degree of 1700 and a saponification degree of 99.2 mole %, and the mixture was heated to prepare a solution. A 201 g quantity of 35% hydrochloric acid and 124 g of n-butylaldehyde were added to the solution as adjusted to a temperature of 20° C. The temperature of the solution was then lowered to 8° C. and maintained at this level to cause a polyvinyl acetal to separate out. The reaction mixture was thereafter maintained at 50° C. for 4 hours to complete the reaction, followed by neutralization, washing with water and drying to obtain polyvinyl butyral in the form of white resin particles (acetalization degree: 66.3 mole %).

iv) Preparation of Resin Film (B)

A 50 g quantity of the polyvinyl butyral was collected, to which 20 g of triethylene glycol di-2-ethylbutyrate was added as a plasticizer. The mixture was thoroughly kneaded with a mixing roll mill. To the kneaded mixture were added 0.05 g of potassium acetate as an additive, 0.08 g of BHT as an antioxidant and 0.08 g of "TINUVIN P," an ultraviolet absorber manufactured by Ciba-Geigy. A predetermined amount of the resulting mixture was thereafter held in a press at 150° C. for 30 minutes to obtain a resin film (B) having a thickness of 0.76 mm.

v) Fabrication of Laminated Glass

The resin films thus prepared were laminated into the structure of resin film (A)/resin film (B)/resin film (A) to obtain an interlayer of the laminate type. The interlayer was then sandwiched between two square float glass plates measuring 3 mm in thickness and 30 cm in the length of each side. The unbonded sandwich assembly was placed into a rubber bag and deaerated in a vacuum of 20 torr for 20 minutes. The assembly as deaerated was placed into an oven at 90° C. and maintained at this temperature for 30 minutes. The sandwich assembly thus deaerated and prebonded was then hotpressed in an autoclave under a pressure of 12 kg/cm$^2$ at a temperature of 135° C. to prepare a transparent laminated glass.

EXAMPLES 2-8

Using aldehydes listed in Table 1, a resin (a) and a resin (b) were obtained in the same manner as in the procedures i) and iii) of EXAMPLE 1. These resins were used to prepare a resin film (A) and a resin film (B), each having the thickness given in Table 1, in the same manner as in the procedures ii) and iv) of EXAMPLE 1. Subsequently, these resin films were laminated into the structure listed in Table 1 in the same manner as in the procedure v) of EXAMPLE 1 to prepare an interlayer of the laminate type, which was used to fabricate a laminated glass.

EXAMPLE 9

A 5 g quantity of a polyvinyl acetal resin (a) prepared in the same manner as in the procedure i) of EXAMPLE 1 was added to a solvent mixture of methyl alcohol and butyl alcohol (1:1 in ratio by weight), followed by stirring with heating to obtain a solution having a concentration of 5 wt. %. To the solution was added 2 g of triethylene glycol di-2-ethylbutyrate as a plasticizer, and the mixture was thoroughly stirred.

A resin film (B) prepared in the same manner as in the procedures iii) and iv) of EXAMPLE 1 was coated over one surface thereof with the solution so that the coating finally obtained was 20 μm in thickness. The coating was dried in a Geer oven. Subsequently, the other surface of the resin film (B) was similarly coated and dried to form a resin film (A) which finally had a thickness of 25 μm.

The resulting film having the superposed film structure of resin film (A)/resin film (B)/resin film (A) was used as an interlayer to fabricate a laminated glass in the same manner as in the procedure v) of EXAMPLE 1.

COMPARATIVE EXAMPLES 1-6

In each of COMPARATIVE EXAMPLES 1 to 3, one resin film was used as an interlayer as shown in Table 1. In each of COMPARATIVE EXAMPLES 4 to 6, a polyvinyl acetal obtained by acetalization with use of an aldehyde not in conformity with the present invention was used as listed in Table 2, and an interlayer of the laminate type shown in Table 1 was prepared in the same manner as in EXAMPLE 1. A laminated glass was fabricated using each of these interlayers.

EXAMPLES 10-17

A resin (a) and a resin (b) obtained with use of aldehydes listed in Table 2 were mixed together by an attrition mill in the ratio given in Table 2 for 10 minutes.

To the mixture were then added the same proportions of the same plasticizer, additive, antioxidant and ultraviolet absorber as used in the procedure iv) of EXAMPLE 1, and the resulting mixture was made into a resin film (C) in the same manner as in the procedure iv) as shown in Table 2.

The interlayer of the resin mixture type thus obtained was used to fabricate a laminated glass in the same manner as in the procedure v) of EXAMPLE 1.

COMPARATIVE EXAMPLES 7 and 8

An interlayer of the resin mixture type was prepared by the same procedure as in EXAMPLE 10 with the exception of using one resin listed in Table 2 in COMPARATIVE EXAMPLE 7 or a polyvinyl acetal obtained by acetalization with propionaldehyde as the resin (b) in COMPARATIVE EXAMPLE 8. A laminated glass was fabricated using the interlayer.

Determination of Sound-Insulating Properties

The laminated glasses of the foregoing examples and comparative examples were tested for sound-insulating properties by the following method.

The laminated glass was subjected to vibration by a vibration generator for damping tests ("G21-005D," product of Shinkensha Co., Ltd.), the resulting vibration characteristics were amplified by a mechanical impedance amplifier ("XG-81," product of Rion Co., Ltd.), and the vibrational spectrum was analyzed by an FFT analyzer ("FFT Spectrum Analyzer HP 3582A," product of Yokogawa Hewlett Packard Ltd.). The transmission loss was calculated from the loss factor thus obtained and the ratio of the laminate to glass in resonance frequency (test temperature: 10° to 40° C.). The minimum of transmission loss around a frequency of 2000 Hz was taken as a TL value. The same procedure as above was also repeated after maintaining the laminated glass at a constant temperature of 5° C. for 30 days to obtain a TL value.

Table 1 shows the test results achieved by the laminated glasses of EXAMPLES 1 to 9 and COMPARATIVE EXAMPLES 1 to 6 with the laminate-type interlayer, and Table 2 shows the results obtained by the laminated glasses of EXAMPLES 10 to 17 and COMPARATIVE EXAMPLES 7 and 8 with the interlayer of the resin mixture type.

Figure 2:
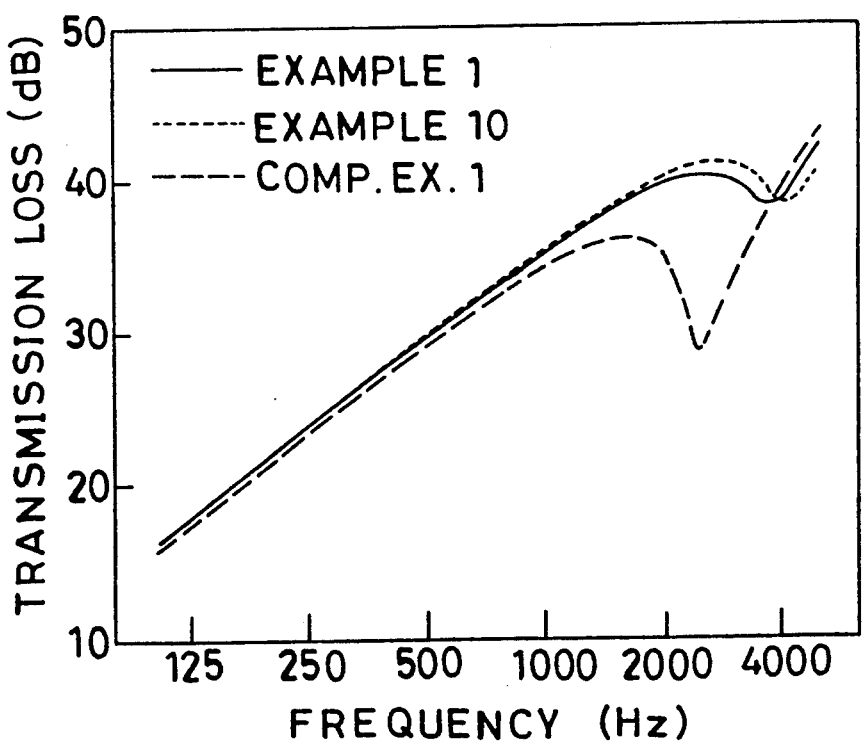
FIG. 2 is a graph showing the relationship between the frequency and the transmission loss as established for the laminated glasses of EXAMPLES 1 and 10 and COMPARATIVE EXAMPLE 1.

FIG. 2 shows the relationship between the frequency and the transmission loss established for the laminated glasses of EXAMPLES 1 and 10, and COMPARATIVE EXAMPLE 1 (test temperature: 22° C.).

TABLE 1

| | Interlayers of the Laminate Type | | | | | | | | | | | | |
|---|---|---|---|---|---|---|---|---|---|---|---|---|---|
| EXAM- | Resin | | | | Plasticizer | Laminate structure | Thickness | TL value at varying temperatures (°C.) | | | | | |
| PLE No. | a (mole %) Aldehyde | | b (mole %) Aldehyde | | (parts by wt.) | Thickness of each resin film (mm) | of interlayer (mm) | 10 | 20 | 22 | 30 | 40 | 30 days later 20 | 22 |
| 1 | n-Octyl | 64.6 | n-Butyr | 66.3 | 40 | A/B/A 0.20/0.76/0.20 | 1.16 | | | 38 | | | | 38 |
| 2 | n-Octyl | 64.6 | n-Butyr | 66.3 | 40 | B/A/B 0.38/0.76/0.38 | 1.52 | | | 35 | | | | 35 |
| 3 | n-Hexyl | 69.3 | n-Butyr | 66.3 | 40 | A/B/A 0.10/0.76/0.10 | 0.96 | | | 37 | | | | 37 |
| 4 | n-Hexyl | 69.3 | n-Butyr | 66.3 | 40 | A/B/A/B/A 0.2/0.38/0.2/0.38/0.2 | 1.36 | | | 39 | | | | 39 |
| 5 | n-Octyl | 64.6 | Propion | 68.0 | 40 | A/B/A 0.20/0.76/0.20 | 1.16 | | | 35 | | | | 35 |
| 6 | n-Octyl | 64.6 | n-Butyr | 66.3 | 40 | B/A/B 0.25/0.30/0.25 | 0.80 | 34 | 37 | | 36 | 33 | | 37 |
| 7 | n-Hexyl | 67.5 | n-Butyr | 66.3 | 40 | B/A/B 0.30/0.60/0.30 | 1.20 | 36 | 38 | | 35 | 32 | | 38 |
| 8 | n-Octyl | 64.6 | n-Butyr | 66.3 | 40 | B/A/B 0.38/0.10/0.38 | 0.86 | 33 | 36 | | 37 | 34 | | 36 |
| 9 | n-Octyl | 64.6 | n-Butyr | 66.3 | 40 | A/B/A 0.02/0.76/0.025 | 0.805 | | | 37 | | | | 37 |
| COMP. 1 | None | | n-Butyl | 66.3 | 40 | B 0.76 | 0.76 | | | 29 | | | | 29 |
| COMP. 2 | n-Hexyl | 67.5 | None | | 40 | A 0.76 | 0.76 | 33 | 31 | | 30 | 26 | | |
| COMP. 3 | None | | n-Butyr | 66.3 | 40 | B 0.76 | 0.76 | 24 | 29 | | 35 | 36 | | 29 |
| COMP. 4 | n-Octyl | 64.6 | n-Hexyl | 67.5 | 40 | A/B/A 0.20/0.76/0.20 | 1.16 | | | 31 | | | | 31 |
| COMP. 5 | n-Butyr | 66.3 | Propion | 68.0 | 40 | A/B/A 0.20/0.76/0.20 | 1.16 | | | 26 | | | | 26 |
| COMP. 6 | Polyvinyl chloride | | n-Butyr | 66.3 | 40 | A/B/A 0.20/0.76/0.20 | 1.16 | | | 35 | | | | 32 |

In Table 1, "COMP." stands for COMPARATIVE EXAMPLE. The glass laminate of COMP. 6 was prepared according to Unexamined Japanese Patent Publication HEI2-229742, Example 1, and was poor in transparency. The value in mole % in the resin column is an acetalization degree.

TABLE 2

| | Interlayers of the Resin Mixture Type | | | | | | | | | | | | | | |
|---|---|---|---|---|---|---|---|---|---|---|---|---|---|---|---|
| EXAMPLE No. | Resin | | | | Plasticizer (parts by wt.) | Mixing ratio (wt. %) | | Thickness of interlayer (mm) | TL value at varying temperatures (°C.) | | | | | 30 days later | |
| | a (mole %) Aldehyde | | b (mole %) Aldehyde | | | a | b | | 10 | 20 | 22 | 30 | 40 | 20 | 22 |
| 10 | n-Octyl | 63.9 | n-Butyr | 66.3 | 40 | 40 | 60 | 0.76 | | 38 | | | | | 38 |
| 11 | n-Octyl | 63.9 | n-Butyr | 66.3 | 40 | 5 | 95 | 0.76 | | 36 | | | | | 36 |
| 12 | n-Hexyl | 67.5 | n-Butyr | 66.3 | 40 | 75 | 25 | 0.38 | | 35 | | | | | 35 |
| 13 | n-Hexyl | 67.5 | n-Butyr | 66.3 | 40 | 75 | 25 | 0.76 | | 37 | | | | | 37 |
| 14 | n-Hexyl | 67.5 | Acet | 73.6 | 40 | 50 | 50 | 1.00 | | 39 | | | | | 39 |
| 15 | n-Octyl | 63.9 | n-Butyr | 66.3 | 40 | 60 | 40 | 0.76 | 35 | 38 | | 35 | 32 | | 38 |
| 16 | n-Octyl | 63.9 | n-Butyr | 66.3 | 40 | 40 | 60 | 0.76 | 34 | 38 | | 36 | 33 | | 38 |
| 17 | n-Hexyl | 67.5 | n-Butyr | 66.3 | 40 | 55 | 45 | 0.76 | 30 | 36 | | 37 | 34 | | 36 |
| COMP. 7 | None | | n-Butyr | 66.3 | 40 | 0 | 100 | 0.76 | 24 | 29 | 29 | 35 | 36 | | 29 |
| COMP. 8 | n-Butyr | 66.3 | Propion | 68.0 | 40 | 40 | 60 | 0.76 | | 25 | | | | | 25 |

"COMP." in Table 2 stands for COMPARATIVE EXAMPLE. The value in mole % in the resin column is an acetalization degree.

Tables 1 and 2 and FIG. 2 reveal that the laminated glasses of EXAMPLES each exhibited a high TL value initially and also after the lapse of 30 days, whereas the laminated glasses of COMPARATIVE EXAMPLES, although high initially in TL value, diminished in this value with lapse of time.

As described above, the sound-insulating interlayer of the present invention is in the form of a laminated film of two kinds of resin films (A) and (B) each comprising a polyvinyl acetal acetalized with an aldehyde having 6 to 10 carbon atoms for the film (A) or with an aldehyde having 1 to 4 carbon atoms for the film (B), or is in the form of a resin film (C) comprising a mixture of the two kinds of polyvinyl acetal resins. The interlayer therefore acts as a constrained layer for effectively absorbing sound energy to prevent diminution of the sound-insulating properties due to a coincidence effect especially in the medium to high sound range around 2000 Hz. Consequently, the interlayer exhibits excellent sound-insulating properties over a wide temperature range for a prolonged period of time while retaining the characteristics required of interlayers for use in laminated glasses.

What is claimed is:

1. An interlayer for use in laminating two or more plates of glass together, the interlayer in the form of a laminated film and comprising at least one resin film (A) and at least one resin film (B), the resin film (A) comprising a resin (a) and a plasticizer, the resin film (B) comprising a resin (b) and a plasticizer, the resin (a) being a polyvinyl acetal having a degree of acetalization of at least 50% and prepared by acetalizing a polyvinyl alcohol with an aldehyde having 6 to 10 carbon atoms, the resin (b) being a polyvinyl acetal having a degree of acetalization of at least 50% and prepared by acetalizing a polyvinyl alcohol with an aldehyde having 1 to 4 carbon atoms.

2. An interlayer as defined in claim 1 wherein the laminated film comprises the resin film (A) and the resin film (B) provided on each of opposite surfaces of the resin film (A), the resin (a) being a polyvinyl acetal prepared by acetalizing the polyvinyl alcohol with an aldehyde having 6 to 8 carbon atoms, the resin (b) being a polyvinyl acetal prepared by acetalizing the polyvinyl alcohol with butyraldehyde.

3. An interlayer for use in laminating two or more plates of glass together, the interlayer in the form of a laminated film (C) comprising a mixture of resin (a), resin (b), and a plasticizer, the resin (a) being a polyvinyl acetal prepared by acetalizing a polyvinyl alcohol with an aldehyde having 6 to 10 carbon atoms, the resin (b) being a polyvinyl acetal prepared by acetalizing a polyvinyl alcohol with an aldehyde having 1 to 4 carbon atoms.

4. An interlayer as defined in claim 3 wherein the resin (a) is a polyvinyl acetal prepared by acetalizing the polyvinyl alcohol with an aldehyde having 6 to 8 carbon atoms, and the resin (b) is a polyvinyl acetal prepared by acetalizing the polyvinyl alcohol with butyraldehyde.

5. An interlayer as defined in claim 3 or 4 wherein the ratio of the resin (a) to the resin (b) mixed therewith is in the range of 2:98 to 90:10 by weight.

6. An interlayer as defined in claim 1 which is in the range of 0.2 to 1.6 mm in thickness.

7. An interlayer as defined in claim 1 wherein the resin film contains the plasticizer in an amount of 20 to 60 parts by weight per 100 parts by weight of the resin.

8. An interlayer as defined in claim 1 wherein the plasticizer is selected from the group consisting of triethylene glycol di-2-ethylbutyrate, triethylene glycol di-2-ethylhexoate, triethylene glycol dicaproate, triethylene glycol di-n-octoate, dibutyl sebacate, dioctyl azelate, dibutylcarbitol adipate and mixtures thereof.

9. A sound-insulating glass laminate comprising an interlayer as defined in claim 1 and sandwiched between a pair of glass plates.

10. An interlayer as defined in claim 3 which is in the range of 0.2 to 1.6 mm in thickness.

11. An interlayer as defined in claim 3 wherein the resin film contains the plasticizer in an amount of 20 to 60 parts by weight per 100 parts by weight of the resin.

12. An interlayer as defined in claim 3 wherein the plasticizer is selected from the group consisting of triethylene glycol di-2-ethylbutyrate, triethylene glycol di-2-ethylhexoate, triethylene glycol dicaproate, triethylene glycol di-n-octoate, dibutyl sebacate, dioctyl azelate, dibutylcarbitol adipate and mixtures thereof.

13. A sound-insulating glass laminate comprising an interlayer as defined in claim 3; the interlayer sandwiched between a pair of glass plates.

* * * * *